US009531179B1

(12) United States Patent
Ferguson et al.

(10) Patent No.: US 9,531,179 B1
(45) Date of Patent: Dec. 27, 2016

(54) STRINGER WHEEL AND CABLE GUIDE APPARATUS

(71) Applicants: Jamie Allen Ferguson, Agency, MO (US); Carl Allen Ferguson, Kearney, MO (US)

(72) Inventors: Jamie Allen Ferguson, Agency, MO (US); Carl Allen Ferguson, Kearney, MO (US)

( * ) Notice: Subject to any disclaimer, the term of this patent is extended or adjusted under 35 U.S.C. 154(b) by 0 days.

(21) Appl. No.: 14/855,555

(22) Filed: Sep. 16, 2015

(51) Int. Cl.
*H02G 1/02* (2006.01)
*H02G 11/02* (2006.01)
*H02G 3/04* (2006.01)

(52) U.S. Cl.
CPC ............... *H02G 11/02* (2013.01); *H02G 3/04* (2013.01)

(58) Field of Classification Search
CPC .............. H02G 1/02; H02G 1/06; H02G 1/08; H02G 3/04; H02G 11/02; B65H 57/14
USPC ......... 254/134 PA, 134.3 R, 134.3 FT, 134.5
See application file for complete search history.

(56) References Cited

U.S. PATENT DOCUMENTS

| 683,515 | A | | 10/1901 | Stewart | |
|---|---|---|---|---|---|
| 2,806,380 | A | * | 9/1957 | Martin | H02G 1/04 254/134.3 PA |
| 3,145,973 | A | * | 8/1964 | MacFarlane | H02G 1/04 254/134.3 PA |
| 3,952,999 | A | * | 4/1976 | Keller | H02G 1/08 254/134.3 R |
| 4,018,422 | A | | 4/1977 | Bozeman, Jr. | |
| 4,386,759 | A | | 6/1983 | Grover et al. | |
| 4,555,093 | A | | 11/1985 | Plummer | |
| 5,064,172 | A | | 11/1991 | Hereford | |
| 5,573,226 | A | * | 11/1996 | Smith | B65H 57/14 226/196.1 |
| 5,901,651 | A | | 5/1999 | Boyd | |
| 5,941,507 | A | * | 8/1999 | Page | B65H 57/14 254/134.3 PA |
| 6,129,340 | A | | 10/2000 | Daniel | |
| 6,315,270 | B1 | | 11/2001 | Fallon | |
| 6,517,052 | B1 | | 2/2003 | Lake | |
| 7,384,023 | B2 | | 6/2008 | Plummer | |
| 7,874,543 | B2 | | 1/2011 | Theisen | |
| 8,302,936 | B2 | | 11/2012 | Plummer | |
| 8,398,057 | B2 | * | 3/2013 | Tukachinsky | B66D 3/06 254/134.3 PA |
| 9,127,788 | B2 | * | 9/2015 | Jones | F16L 3/18 |

(Continued)

*Primary Examiner* — Monica Carter
*Assistant Examiner* — Nirvana Deonauth
(74) *Attorney, Agent, or Firm* — Dale J. Ream

(57) ABSTRACT

A cable guide apparatus includes a wheel assembly having a hub and a plurality of spokes extending radially outwardly from the hub, the wheel assembly having a rim coupled to distal ends of the plurality of spokes that equally displace the rim from the hub and rotatably coupled to the hub. The rim includes an outer face defining a groove configured to receive the conductor cable in a nested arrangement as the cable is strung and tensioned. The cable guide apparatus includes a guide assembly having a framework operatively coupled to the hub of the wheel assembly, the guide assembly having a pair of roller members rotatably coupled to the framework. Each roller member has an elongate and generally cylindrical configuration situated adjacent the groove of the outer face of the rim and configured to maintain the conductor cable in the groove.

16 Claims, 15 Drawing Sheets

(56) References Cited

U.S. PATENT DOCUMENTS

| | | | |
|---|---|---|---|
| 2009/0283732 A1* | 11/2009 | Ebbenga | B66D 1/26 |
| | | | 254/272 |
| 2011/0127475 A1* | 6/2011 | Ballard | H02G 3/30 |
| | | | 254/134.3 R |
| 2011/0259633 A1* | 10/2011 | Venne | H02G 1/04 |
| | | | 174/45 R |
| 2013/0026429 A1* | 1/2013 | Jordan | H02G 1/08 |
| | | | 254/134.3 R |
| 2014/0183428 A1* | 7/2014 | Wright | B66D 1/36 |
| | | | 254/333 |

* cited by examiner

STRINGER WHEEL AND CABLE GUIDE APPARATUS

BACKGROUND OF THE INVENTION

This invention relates generally to cable stringing equipment and, more particularly, to a stringer wheel and cable guide apparatus for maintaining a conductor cable, communication line, or the like securely nested in the groove of a stringer wheel during stringing, especially when the cable is previously or subsequently at an angle relative to the stringer wheel.

Aerial cables are installed in many above ground applications, such as electrical conductive wires extending between poles or towers, telephone lines extending between telephone poles, fiber optic cables for data communications, and the like. Miles of these cables are typically installed by using motorized puller that pulling the wires from a spool through a series of stringer wheels to their eventual position atop spaced apart poles or towers. Each stringer wheel, also referred to as a pulley or stringer block, may define a groove or channel into which the cable is nested in order not to fall out and control over its alignment and direction.

Although the cables may extend for miles in generally linear arrangements such that a loss of cable alignment in the groove is unlikely, there are occasions when mild to sharp angles or turns are needed. The pulling of a cable at an angle to the stringing wheel increasing the risk that the cable will jump out of the groove and completely lose contact with the stringer wheel—a condition that may require the entire pulling operation to pause while human effort is expended to physically realign the cable. In fact, a human line worker may have to be positioned at the location of the angled line to manually hold the cable in place—sometimes by use of a bucket lift or by climbing a tower.

Therefore, it would be desirable to have a stringer wheel and cable guide apparatus having upstanding roller members positioned proximate upstream and downstream edges of a rim of a stringer wheel assembly that urge a cable to stay nested in the wheel's cable receiving groove, especially when the cable is being pulled at an angle relative to the wheel. Further, it would be desirable to have a stringer wheel and cable guide apparatus that is selectively coupled to either side of the wheel assembly depending on the angle or direction the cable will be pulled on its way to a next wheel assembly.

SUMMARY OF THE INVENTION

A stringer wheel and cable guide apparatus according to the present invention includes a wheel assembly having a hub and a plurality of spokes extending radially outwardly from the hub, the wheel assembly having a rim coupled to distal ends of the plurality of spokes that equally displace the rim from the hub and so as to be rotatably coupled to the hub. The rim includes an outer face defining a groove configured to receive the conductor cable in a nested arrangement as the cable is strung and tensioned. The stringer wheel and cable guide apparatus includes a guide assembly having a framework operatively coupled to the hub of the wheel assembly, the guide assembly having a pair of roller members rotatably coupled to the framework. Each roller member has an elongate and generally cylindrical configuration situated adjacent the groove of the outer face of the rim and configured to maintain the conductor cable in the groove.

Therefore, a general object of this invention is to provide stringer wheel and cable guide apparatus that effectively urges a conductor cable, communication line, or the like to stay nested in the groove of a stringer wheel as it is being pulled thereover in a cable stringing process.

Another object of this invention is to provide a stringer wheel and cable guide apparatus, as aforesaid, in which a guide assembly is coupled adjacent a wheel assembly and includes at least one roller member positioned closely proximate the groove of a rim of the wheel assembly, the roller being configured to rotate or "roll" when the cable is drawn over it.

Still another object of this invention is to provide a stringer wheel and cable guide apparatus, as aforesaid, in which a respective roller member is particularly situated to contact a cable that is being drawn downstream of the wheel assembly at an angle, such as when a next wheel assembly in a series of wheel assemblies is at an angle or even perpendicular relative to the plane of the present wheel assembly.

Yet another object of this invention is to provide a stringer wheel and cable guide apparatus, as aforesaid, in which a framework of the cable guide assembly is selectively mounted to a hub of the wheel assembly.

A further object of this invention is to provide a stringer wheel and cable guide apparatus, as aforesaid, that may be positioned on the ground, lifted into the air by helicopter, or hung from a tower.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A stringer wheel and cable guide apparatus for use in stringing electrical conductor cable and other communication lines according to a preferred embodiment of the present invention will now be described in detail with reference to FIGS. 1 to 15 of the accompanying drawings. The stringer wheel and cable guide apparatus 10 includes a wheel assembly 20 configured to receive a cable as it is being strung or tensioned and a guide assembly 50 immediately adjacent the wheel assembly 20 configured to make sure the cable does not become misaligned or dislodged from its intended position relative to the wheel assembly 20—especially when the cable is being strung at an angle between a plurality of stringer wheels or otherwise not in a linear arrangement.

Figure 3:
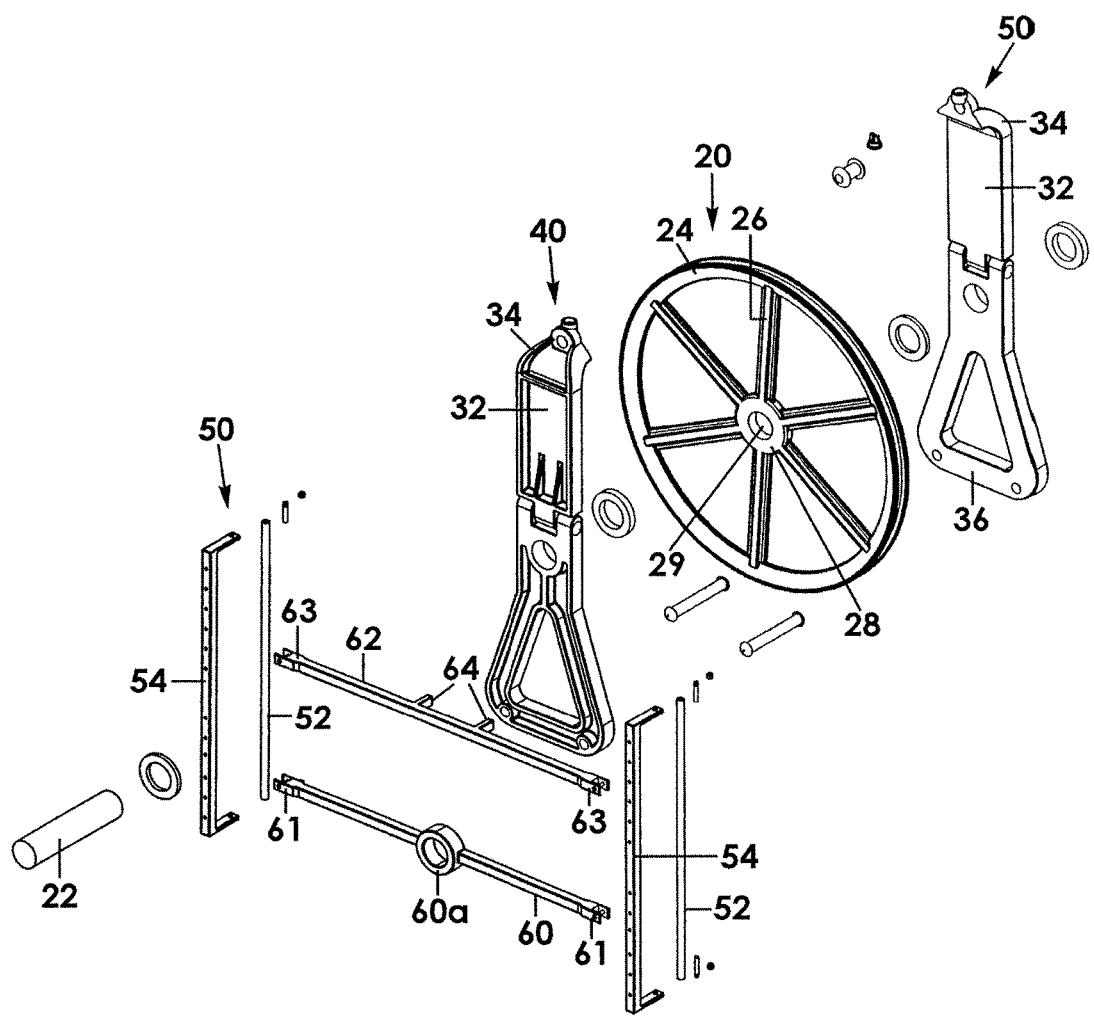
FIG. 3 is an exploded view of the stringer wheel and cable guide apparatus as in FIG. 2.
Figure 4:
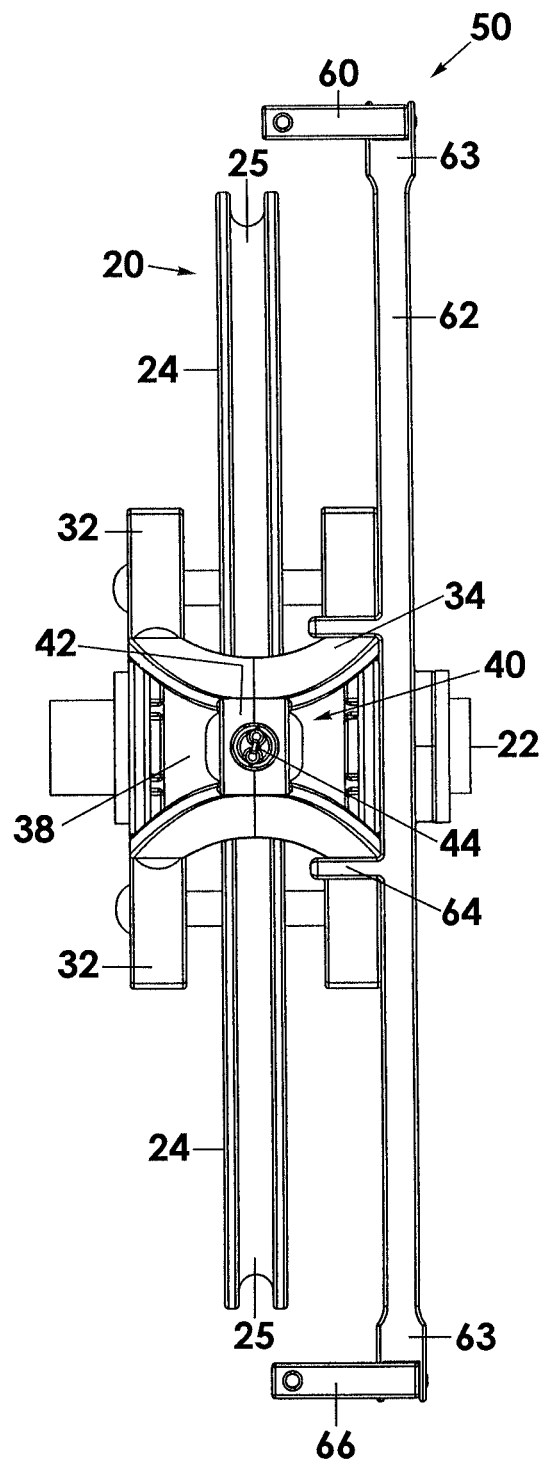
FIG. 4 is a top view of the stringer wheel and cable guide apparatus as in FIG. 1.
Figure 5:
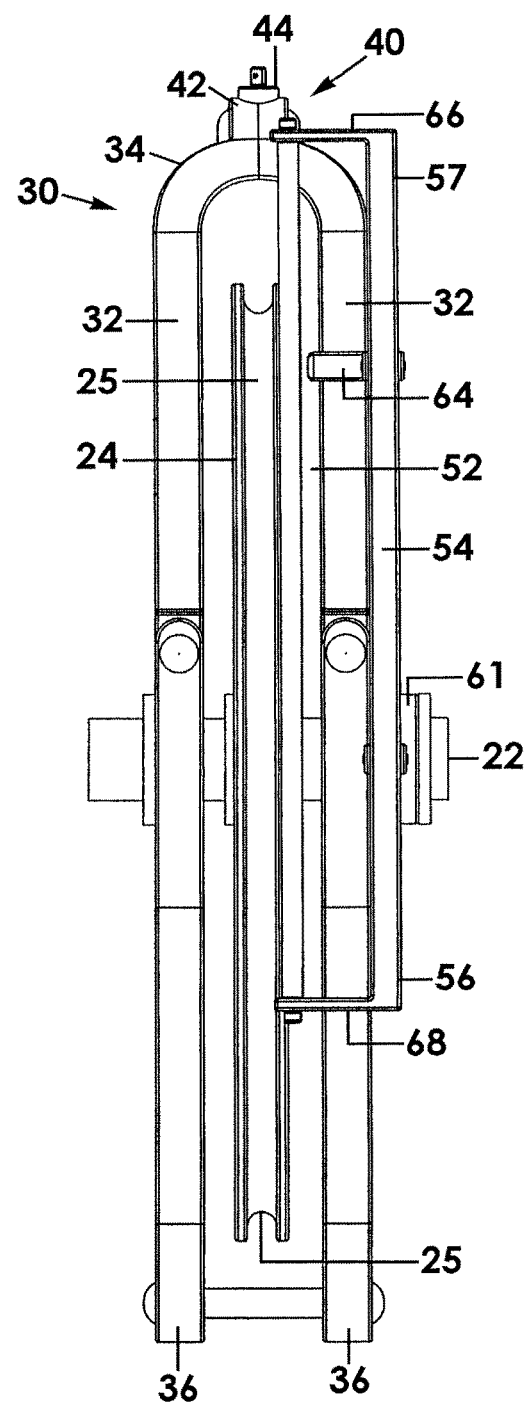
FIG. 5 is a side view of the stringer wheel and cable guide apparatus as in FIG. 1.
Figure 6:
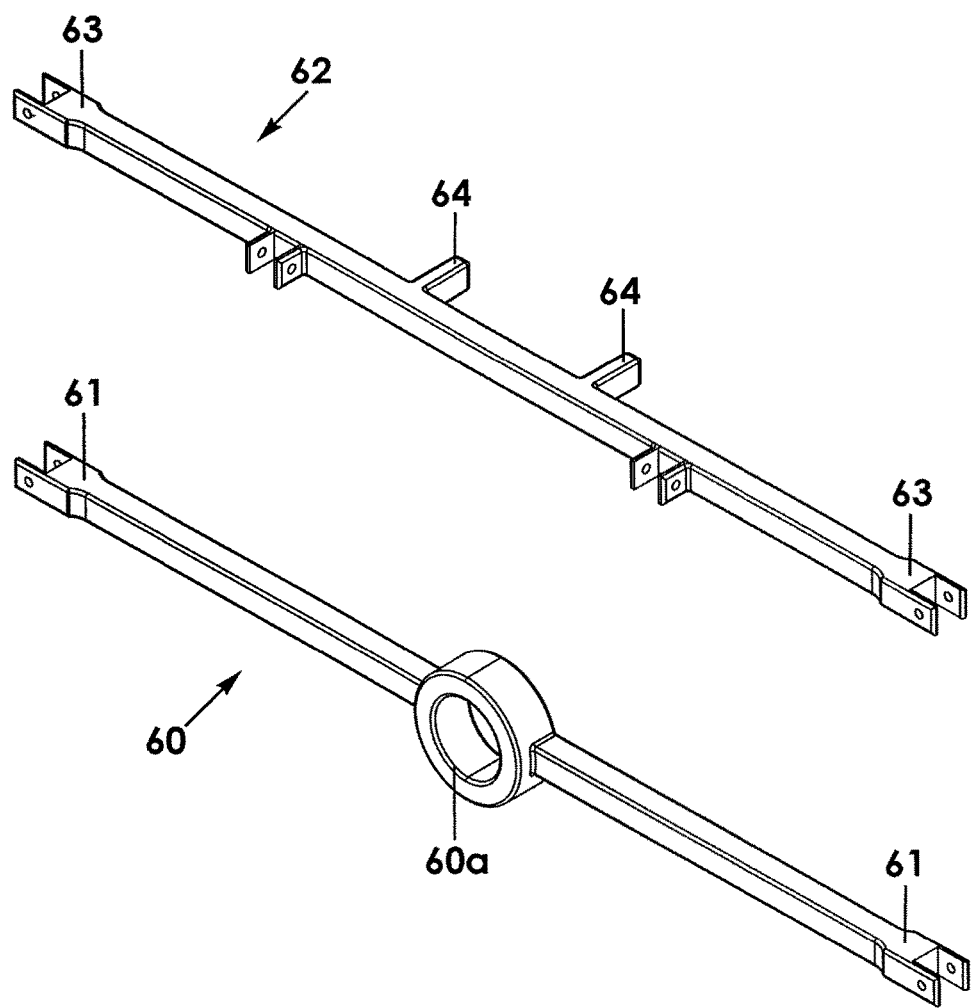
FIG. 6 is a perspective view of struts removed from the guide assembly of the stringer wheel and cable guide apparatus as in FIG. 2.
Figure 7:
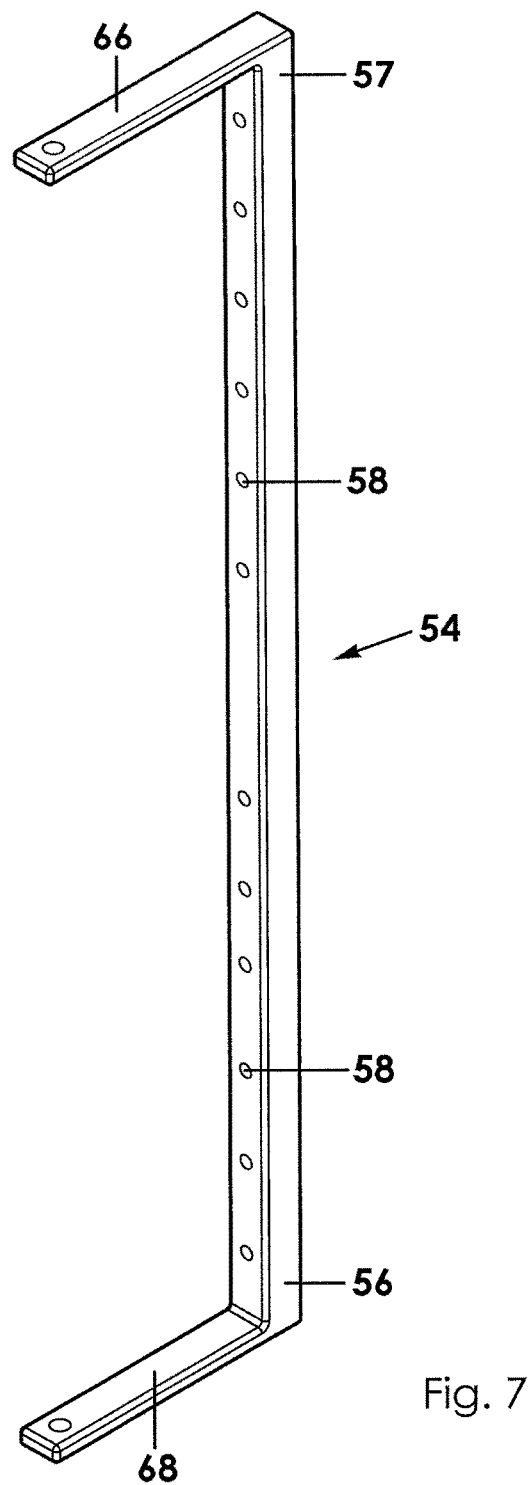
FIG. 7 is a perspective view of support members removed from the guide assembly of the stringer wheel and cable guide apparatus as in FIG. 2.
Figure 8:
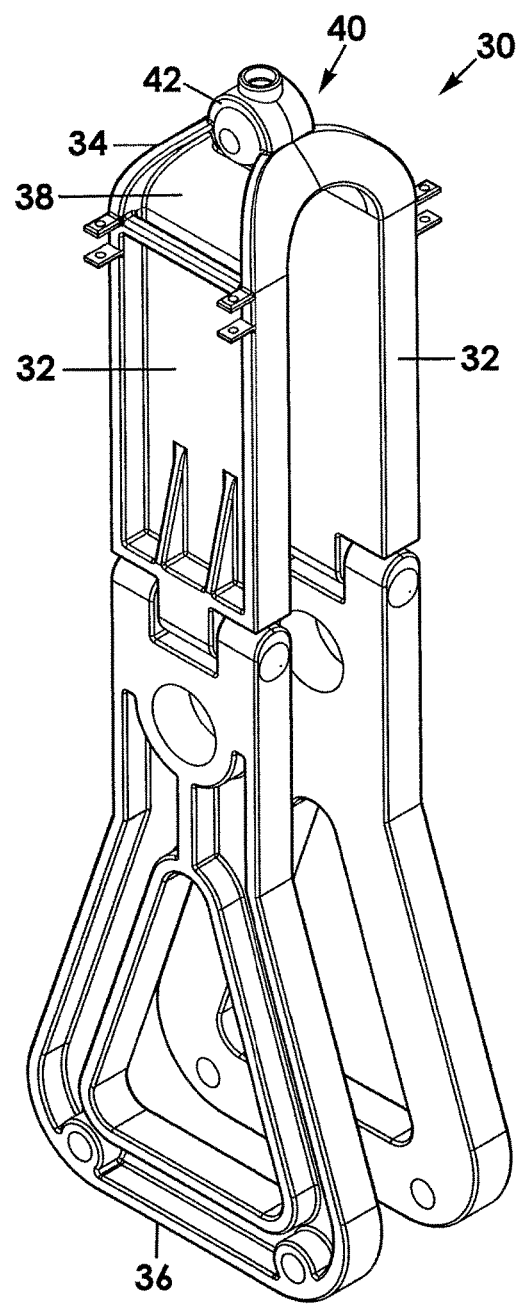
FIG. 8 is a perspective view of a carriage removed from wheel assembly of the stringer wheel and cable guide apparatus as in FIG. 2.
Figure 9:
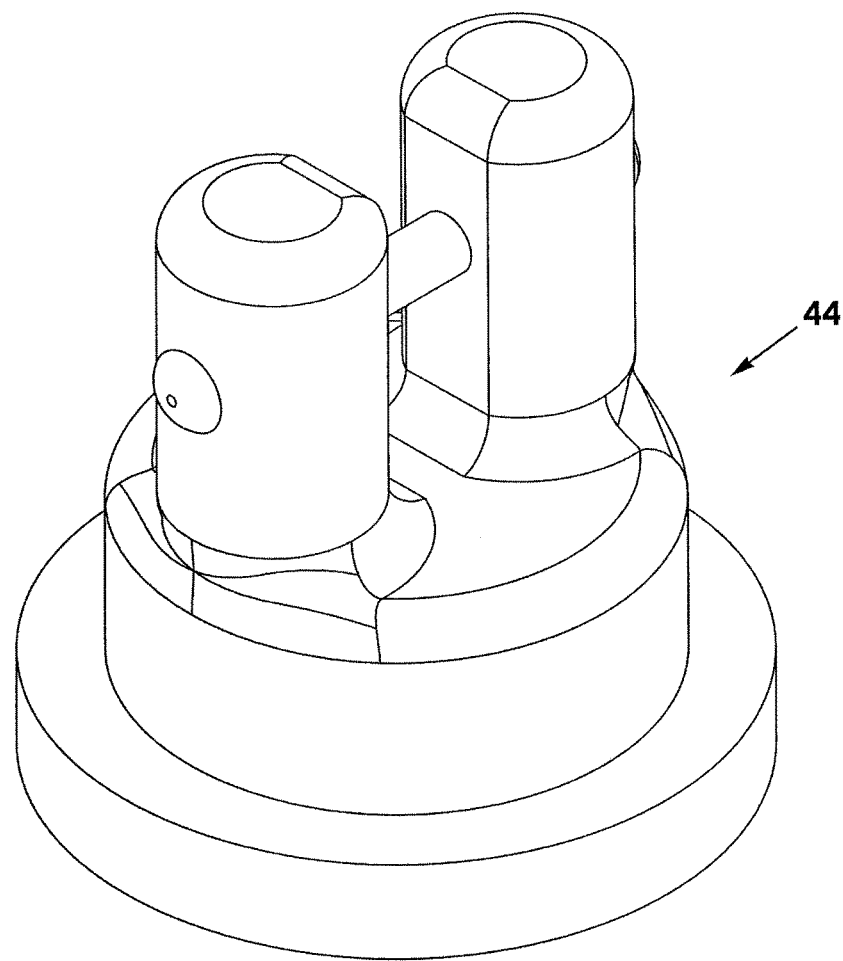
FIG. 9 is an isolated perspective view of the mounting section of the main coupling removed from the stringer wheel and cable guide apparatus as in FIG. 2.
Figure 10:
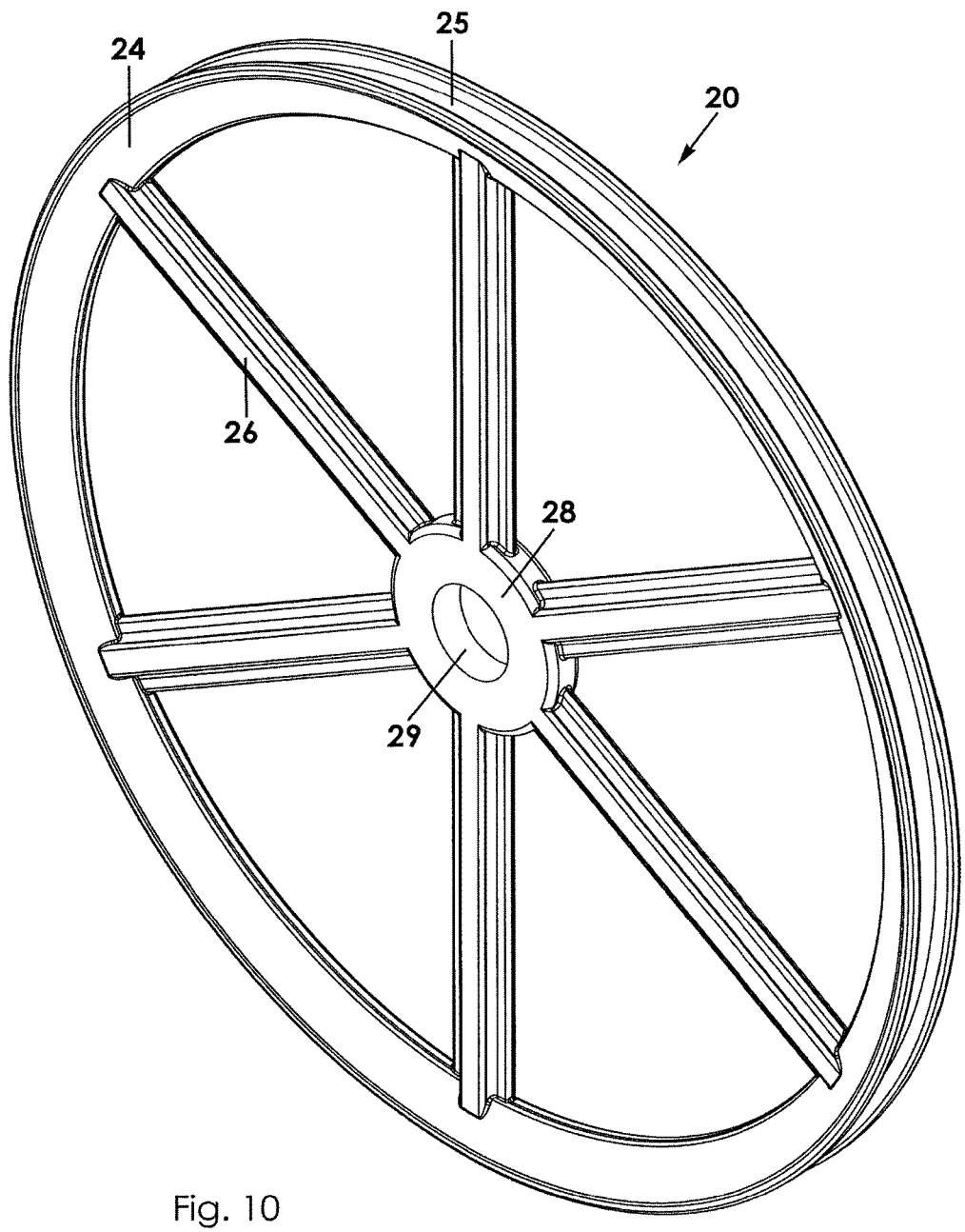
FIG. 10 is a perspective view of a wheel assembly removed from the stringer wheel and cable guide apparatus as in FIG. 1.
Figure 11:
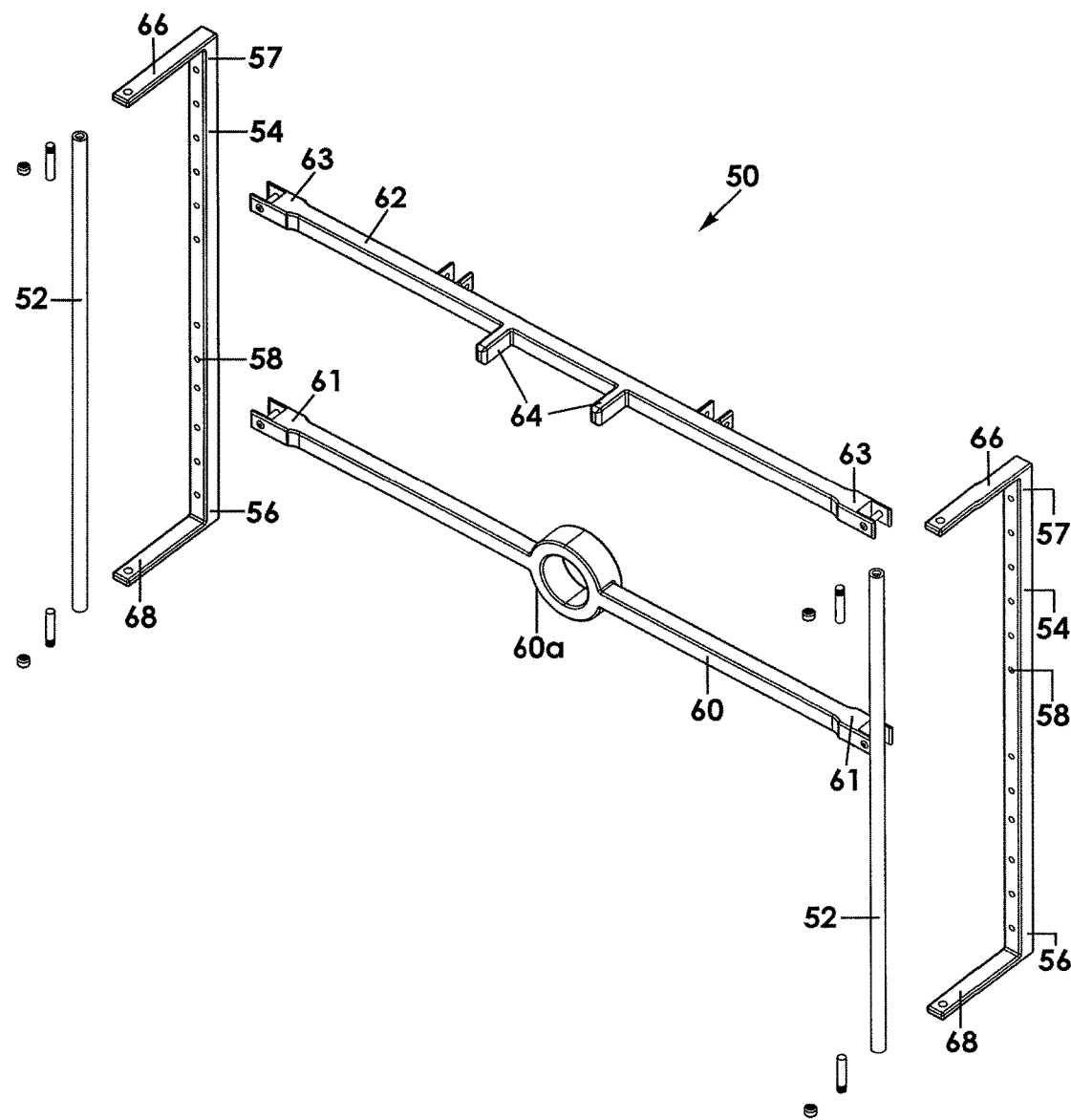
FIG. 11 is a perspective view of a cable guide assembly removed from the stringer wheel and cable guide apparatus as in FIG. 2.
Figure 12:
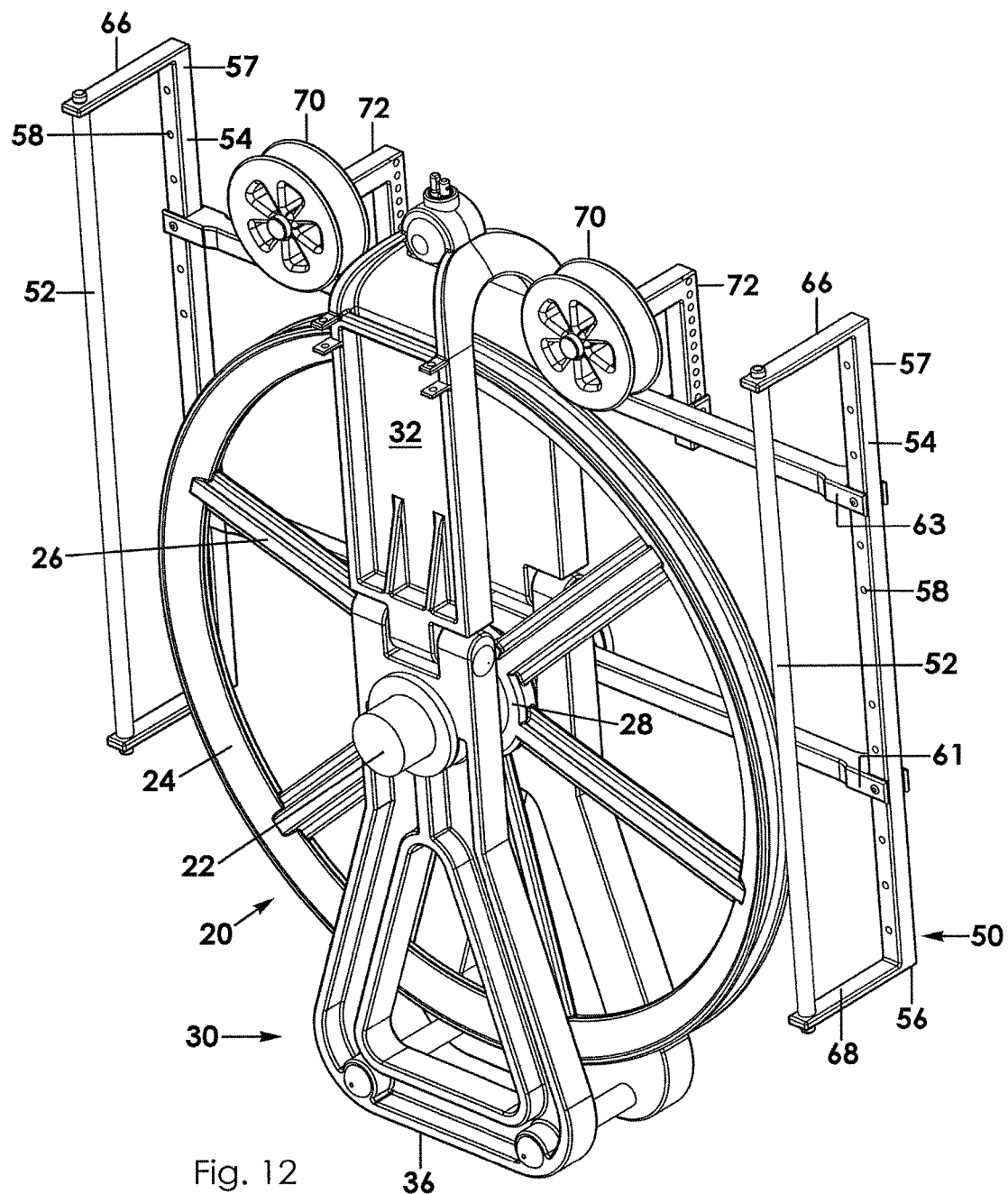
FIG. 12 is a perspective view of a cable guide apparatus having an auxiliary wheel operatively coupled to a respective upper strut of the guide assembly thereof and positioned inline with the groove of the rim of the stringer wheel and cable guide assembly.

The stringer wheel and cable guide apparatus 10 includes a wheel assembly 20 and a cable guide assembly 50. The wheel assembly 20 includes a hub 22 and a generally circular rim 24 displaced from the hub 22. More particularly, the hub 22 may be a cylindrical rod having a linear configuration as it functions as an axle defining a longitudinal axis about which other components are rotatably coupled as will be described later. The rim 24 includes a circular configuration and is displaced from the hub 22 by a plurality of spaced apart spokes 26 that extend radially between the hub 22 and rim 24. In other words, each spoke 26 includes a proximal end operatively coupled to the hub 22 and a distal end coupled to an inner face of the rim 24 (FIG. 3).

The wheel assembly 20 may include a center section 28 that defines a bore 29 through which the hub 22 is received so that the wheel assembly 20 is selectively rotatable about the hub 22 and its axis. In an embodiment, proximal ends of the spokes 26 are coupled to the center section 28 and the center section 28 is rotatably coupled to the hub 22 (FIG. 3). The rim 24, therefore, is operatively and rotatably coupled to the hub 22.

The rim 24 includes an outer face that defines a groove 25 (FIGS. 2 and 5) having a depth suitable to receive a conductor cable or other transmission line (not shown), the rim 24 being configured to rotate about the hub 22 as a cable is drawn over and across it due to friction caused by the pulled cable. It is understood that wheel assemblies according to various embodiments may include different diameters, outer faces of narrower or wider widths, and grooves of various depths depending on the size or type of cable being strung or tensioned. The wheel assembly 20 as a whole defines a first imaginary plane. Specifically, the center section 28, spokes 26, and side surfaces of the rim 24 are situated within the first imaginary plane.

The wheel assembly 20 may also include a carriage 30 configured so that the hub 22 and rim 24 combination may be hoisted into the air (such as by a helicopter or crane) or mounted to a tower, or the like during a cable stringing or tensioning procedure. The carriage 30 may include a first leg member 32 positioned adjacent one side of the hub 22 and a second leg member 32 positioned adjacent another side of the hub 22. (the leg members are intentionally referred to by the same reference numeral as they have substantially the same construction.

Each leg member includes a lower end 36 situated lowerly beyond a lower peripheral edge of the rim 24 and an upper end 34 situated upwardly beyond an upper peripheral edge of the rim 24. The carriage 30 may include a bridge 38, i.e. a section that connects respective upper ends of the first leg member 32 to the second leg member 32. One or both of the leg members may be coupled to the hub 22 but, preferably, with a bearing or the like that does not result in the carriage 30 rotating with the hub 22.

The wheel assembly 20 may need to be suspended from a tower or carried by a helicopter or crane to a desired location and position where an electrically conductive cable or communication wire is to be pulled and tensioned. Accordingly, a main coupling 40 may be mounted atop the bridge 38 that enables the carriage 30 and entire wheel assembly 20 to be hoisted by a chain, cable, or other tethering device. The carriage 30 includes a base section 42 mounted to an upper surface of the bridge 38. A mounting section 44 is then rotatably coupled to the base section 42 and is configured such that a hook or coupling from the tether of a crane or fastener from a tower may be attached.

In another aspect, the cable guide assembly 50 includes a framework that is coupled to the wheel assembly 20 and positioned adjacent thereto so as to keep a cable properly nested in the groove 25 of the rim 24. The guide assembly 50 includes a pair of roller members 52 rotatably coupled to opposed ends of the framework and configured to rotate as a cable is drawn over and across it due to friction caused by the pulled cable. Each roller member 52 has a generally cylindrical configuration, such as a rod, and a generally elongated configuration. Further, the framework includes a pair of spaced apart upstanding support members 54 positioned proximate and adjacent to respective roller members 52.

In an embodiment, the cable guide assembly 50 may only include a single roller member 54 positioned adjacent one of an upstream or downstream end of the rim 24. In an embodiment, the roller member may be coupled to the framework in a fixed and non-rotatable configuration.

Figure 1:
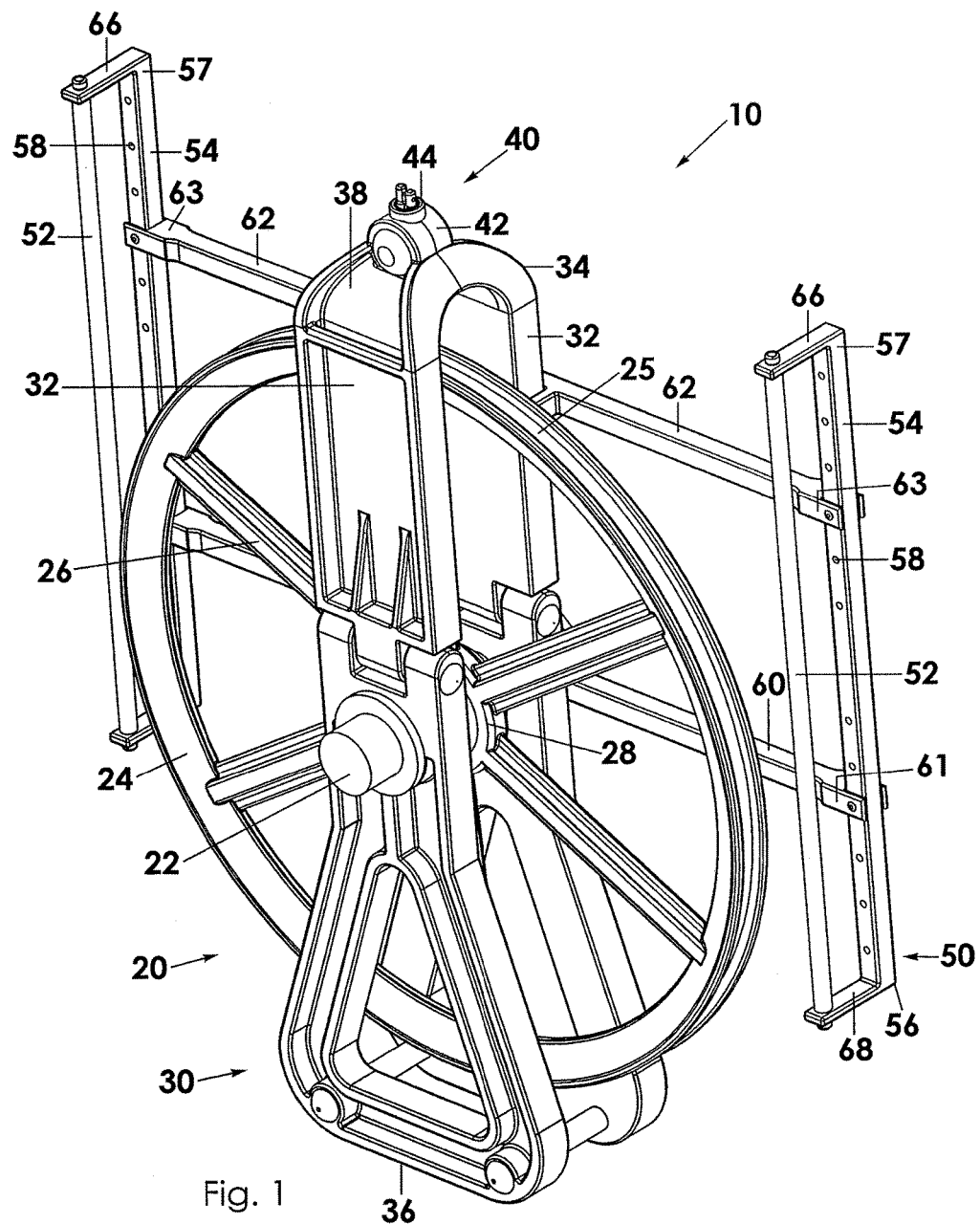
FIG. 1 is a front perspective view of a stringer wheel and cable guide apparatus according to a preferred embodiment of the present invention.
Figure 2:
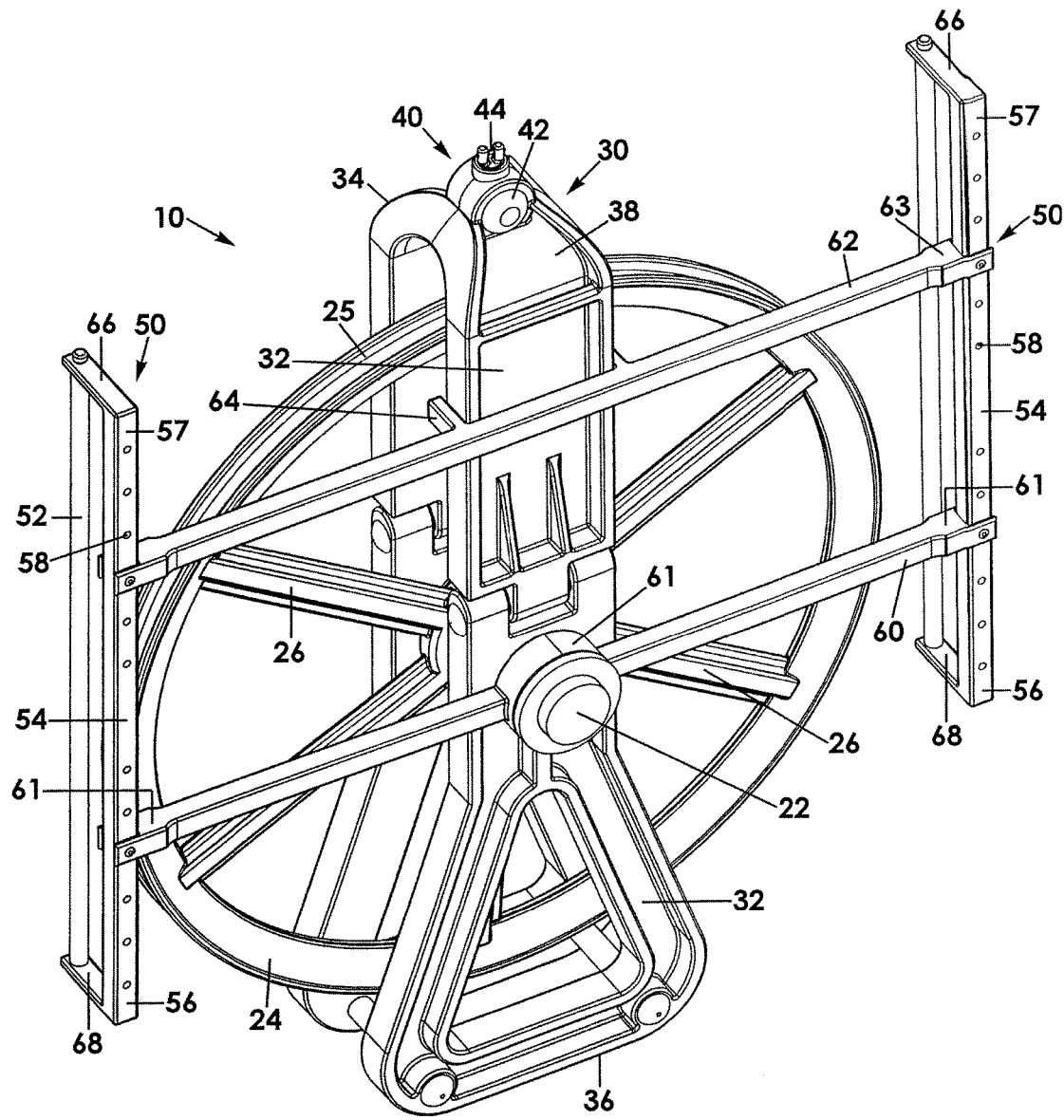
FIG. 2 is a rear perspective view of the stringer wheel and cable guide apparatus as in FIG. 1.

The framework includes a first strut 60 extending between the spaced apart upstanding support members 54. In an embodiment, the support members 54 have a generally vertical orientation in the manner of support posts and the first strut 60 has a generally horizontal configuration joining and spacing apart the support members (FIG. 2). In an embodiment, the first strut 60 is coupled to the hub 22 preferably with a bearing 60a or the like so that the framework is not rotated about the imaginary axis defined by the hub 22. The support members 54 are positioned adjacent upstream and downstream ends of the rim 24 as will be described more fully later.

Each support member 54 includes a lower end 56 and an opposed upper end 57, the support member 54 having a generally linear configuration. Further, each support member 54 includes an upper flange 66 extending perpendicularly away from each respective upper end 57 and a lower flange 68 extending perpendicularly away from each respective lower end 56. Each flange extends in the direction toward the wheel assembly 20. Opposed ends of respective roller members 52 are rotatably coupled to respective upper 66 and lower 68 flanges 68 respective support members 54. Accordingly, there is a roller member 52 associated with each support member 54. More particularly, a roller member 52 is adjacent and parallel to the support member 54 to which it is operatively coupled via respective upper and lower flanges.

Figure 13:
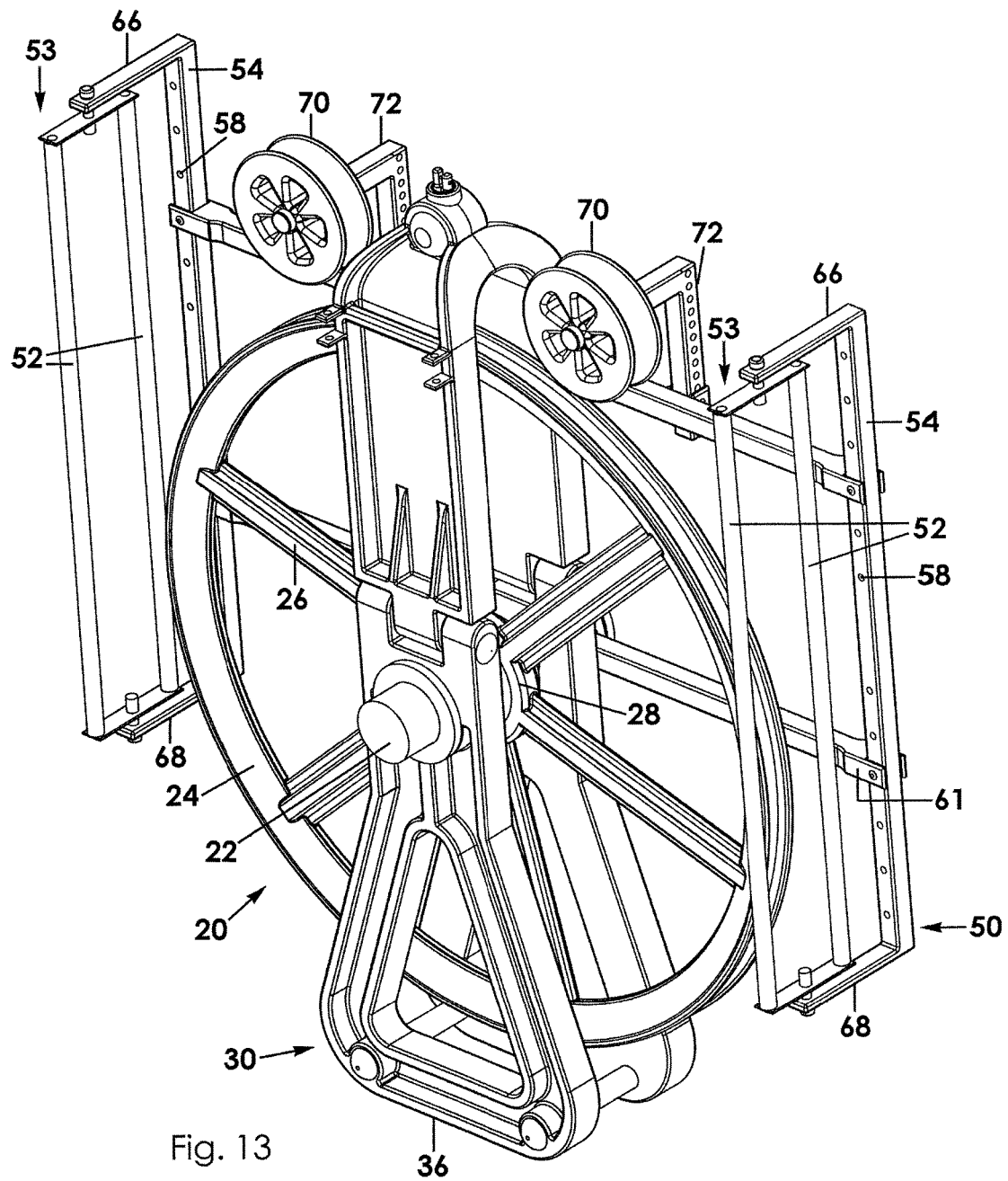
FIG. 13 is a perspective of a stringer wheel and cable guide apparatus according to another embodiment in which a roller assembly having a pair of spaced apart rollers is pivotally coupled to a respective flange of a respective support member and extends adjacent one of an upstream or downstream end of the wheel assembly.

In an embodiment, a roller assembly 53 having a pair of spaced apart roller members 54 may be pivotally coupled to terminal ends of respective flanges 66, 68 (FIG. 13). The pair of spaced roller members 54 of the roller assembly 53 are configured to be positioned adjacent an upstream end and downstream end of the rim 24 such that a conductor cable may be extended between the roller members 54 and thus guided effectively in the event the cable is directed rearwardly or forwardly of the wheel assembly 20. In an embodiment, the roller assembly 53 may be swiveled between a position substantially parallel with the wheel assembly 20 (FIG. 15) or substantially perpendicular thereto (FIG. 13) or to a desired angle. With this construction, a user has more options for guiding a conductor cable efficiently in various directions.

Figure 14:
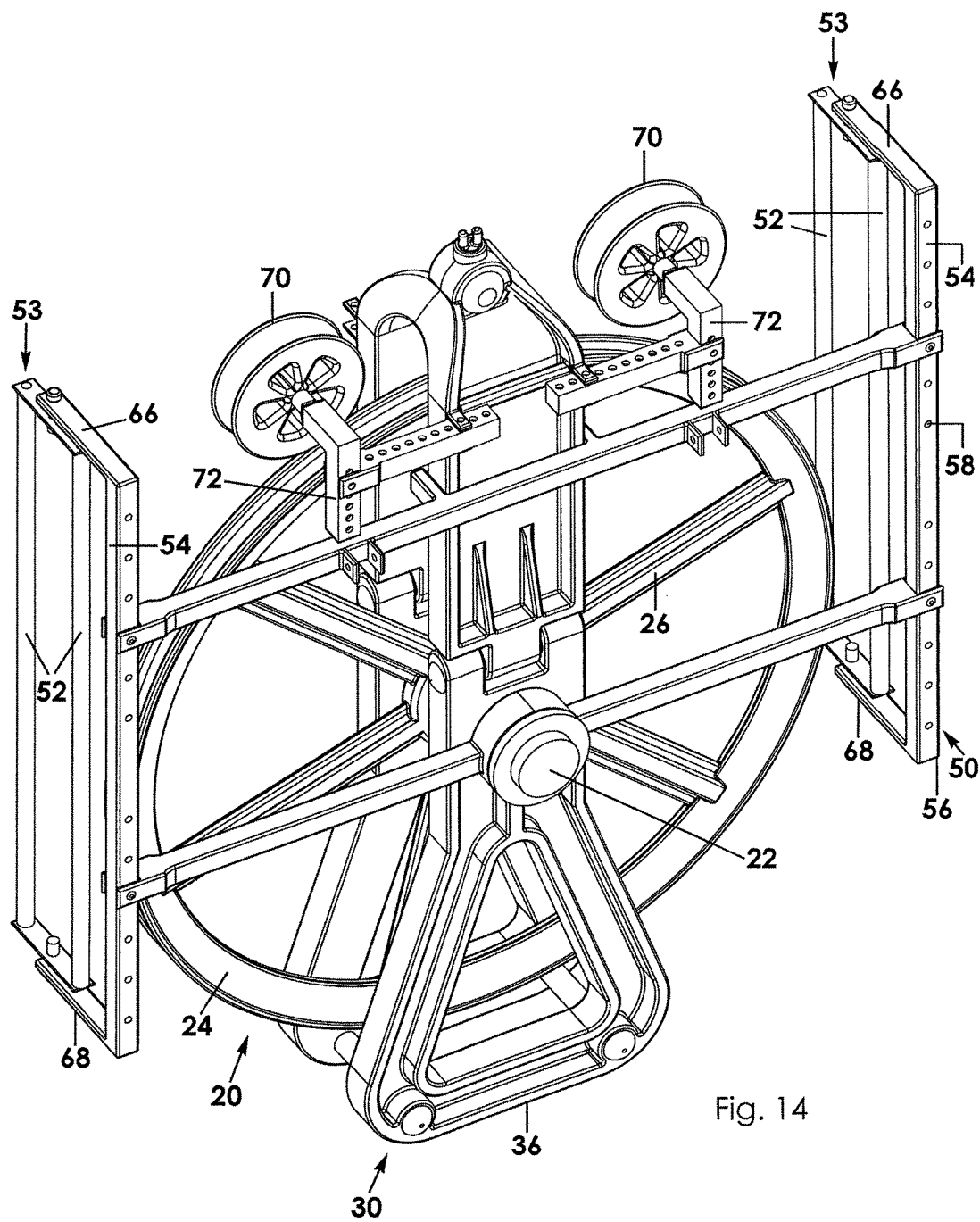
FIG. 14 is a perspective view of a cable guide apparatus having an auxiliary wheel operatively coupled to the carriage of the wheel assembly and positioned inline with the groove of the rim of the stringer wheel and cable guide assembly.
Figure 15:
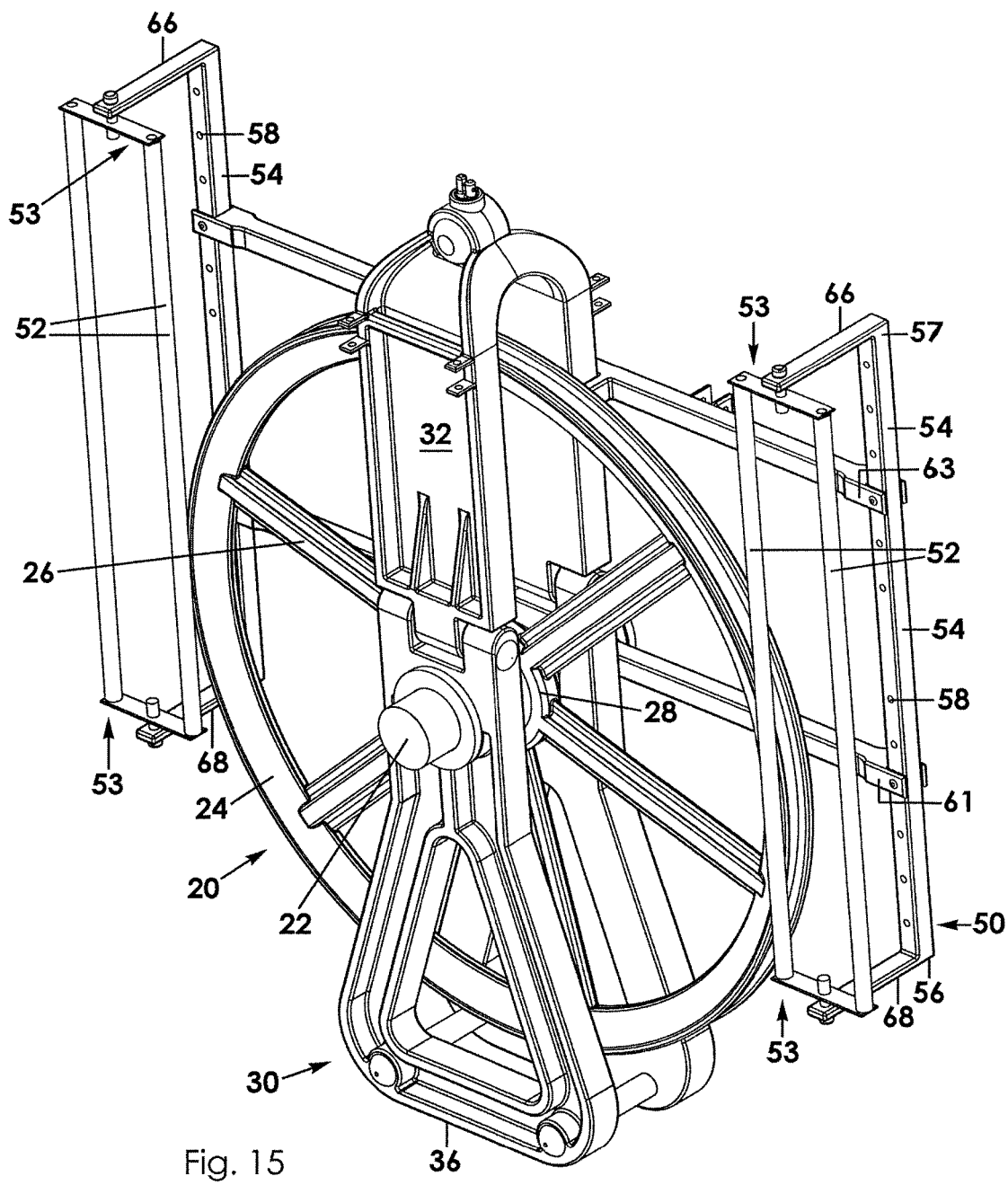
FIG. 15 is a perspective of a stringer wheel and cable guide apparatus according to another embodiment in which a roller assembly having a pair of spaced apart rollers is pivotally coupled to a respective flange of a respective support member and extends adjacent one of an upstream or downstream end of the wheel assembly.

FIG. 15 illustrates an exemplary embodiment in which the roller assembly 53 is positioned adjacent a far side of the wheel assembly 20 relative to the guide assembly 50. When swiveled to the parallel configuration, both spaced apart roller members 54 of a roller assembly 53 are adjacent the far side of the wheel assembly 20. When swiveled to a perpendicular configuration, one roller member 54 is positioned adjacent either side of the rim 24 (FIGS. 13 and 14). It is understood that respective flanges 60 may have length dimensions that determine whether the roller assembly 53 is situated on a far side or near side of the wheel assembly 20. In an embodiment, the flanges 60 may be length adjustable (not shown).

In an embodiment shown in FIGS. 12-15, the stringer wheel and cable guide apparatus includes an auxiliary wheel 70 operatively coupled to the guide assembly 50, such as with a bracket 72. More particularly, the bracket 72 may have a first end coupled to a second strut 62 of the framework of the guide assembly 50 and an opposed second end coupled to the auxiliary wheel 70, the bracket 72 being configured to position the auxiliary wheel 70 inline with the groove 25 of the rim 24 of the wheel assembly 20. Preferably, the auxiliary wheel 70 has a dimension that is substantially smaller than a width of the rim 24 itself and the bracket 72 positions the auxiliary wheel 70 adjacent an upward extent of the rim 24 so as to maintain a conductor cable in the groove 25 even if being directed in a sharply upward direction toward a next downstream wheel assembly 20. The bracket 72 may be position-adjustable, such as with an aperture/pin construction, so that the position of the auxiliary wheel 70 relative to the rim 24 may be adjustable.

In an embodiment similar to that described immediately above, the auxiliary wheel 70 may be coupled directly to the carriage 30 of the rim 24 of the wheel assembly 20 without regard to the guide assembly 50 (FIG. 14). In other words, the auxiliary wheel 70 may be used independently with a rim 24. Specifically, the first end of the bracket 72 may be coupled to the carriage 30 and the second end of the bracket 72 to the auxiliary wheel 70 for positioning the auxiliary wheel 70 inline with the groove 25 of the rim 24.

The framework may include a second strut 62 extending between the spaced apart support members 54. The second strut 62 is parallel to and spaced apart from the first strut 60 (FIG. 2). The second strut 62 may include a pair of spaced apart alignment or guide bars 64 extending perpendicularly away from an inner surface of the second strut 62. The guide bars 64 are specifically configured to surround or receive a respective leg member 32 of the carriage 30 therebetween (FIG. 2). It is important that the framework of the cable guide assembly 50 fit snugly and surely to the wheel assembly 20 so that a cable being extend along the groove 25 of the rim 24 is appropriately contacted by respective roller members 52 and, as a result, maintained in a nested arrangement in the groove 25.

In an embodiment, each support member 54 may include a plurality of spaced apart apertures. Cooperatively, opposed ends of the first strut 60 and second strut 62 include fasteners 61, 63, respectively, such as brackets, clasps, clips, or the like, that may be aligned with selected apertures 58 and secured with pins, screws, bolts, or the like (FIG. 3). In use, the support members 54 may be adjusted vertically as may be appropriate and desirable based on the size of the rim 24 of the wheel assembly 20 to which the guide assembly 50 is attached. Preferably, the framework is adjusted such that one roller member 52 is positioned on an upstream (incoming) side of the rim 24 and another roller member 52 is positioned on a downstream (outgoing) side of the rim 24.

The framework—specifically, the upstanding support members 54 and first strut 60 that connects them—defines a second plane. When the framework is coupled to the wheel assembly 20 as described above, the wheel assembly 20 and framework of the cable guide assembly 50 are parallel to one another. In other words, the first plane is parallel to the second plane as defined above.

In use, the framework of the cable guide assembly 50 of the stringer wheel and cable guide apparatus is coupled to the wheel assembly 20. More particularly, the second strut 62 of the framework may be coupled to the hub 22 of the wheel assembly 20 or to another component thereof. The support members 54 may be vertically adjusted as described above such that the pair of roller members 52 are appropriately positioned adjacent upstream and downstream peripheral ends of the rim 24 of the wheel assembly 20. Specifically each roller member 52 is positioned slightly to one side of precisely where the cable will enter or leave a nested position in the groove 25 defined by the outer face of the rim 24. Accordingly, if a prior wheel assembly or next wheel assembly to be encountered by a cable is at an angle or even perpendicular to the present wheel assembly 20, the cable will encounter a respective roller member 52 and not risk jumping out of the groove 25.

It is understood that if the cable needs to be angled in an opposite angle or direction, a cable guide assembly 50 may be positioned and coupled to an opposite side of a respective wheel assembly 20 and will function in all substantial respects as described above to again maintain the cable in its nested arrangement in the groove 25 of the rim 24. It is also understood that any reference above to "vertical" or "horizontal" is by way of illustration of an exemplary embodiment but not limiting in that the present invention will work however it is oriented relative to a cable.

It is understood that while certain forms of this invention have been illustrated and described, it is not limited thereto except insofar as such limitations are included in the following claims and allowable functional equivalents thereof.

The invention claimed is:

1. A cable guide apparatus for guiding a conductor cable along a wheel assembly of a type having a rim rotatably coupled upon a hub and that defines a groove configured to receive the conductor cable, said cable guide apparatus, comprising: a guide assembly having a framework selectively coupled to the wheel assembly, said guide assembly having a plurality of roller members coupled to said framework, each roller member having an elongate and generally cylindrical configuration positioned adjacent the groove of an outer face of said rim and configured to maintain the conductor cable in the groove when coupled to the wheel assembly; wherein: each roller member defines a vertical axis: each roller member is rotatably coupled to said framework and configured to rotate when the cable travels thereover: said framework includes a pair of spaced apart upstanding elongate support members displaced from one another and proximate said outer face of said rim, each support member being adjacent to, displaced from, and parallel to a respective roller member: each support member defines a vertical axis rearwardly displaced from and not in common with said vertical axis defined by each said roller member, respectively.

2. The cable guide apparatus as in claim 1, wherein each support member includes: an upper end and an opposed lower end and has a generally linear configuration; an upper flange coupled to a respective said upper end and extending outwardly; a lower flange coupled to a respective said lower end and extending outwardly; wherein opposed free ends of said roller members are rotatably coupled to respective upper and lower flanges.

3. The cable guide apparatus as in claim 1, wherein said framework includes a first strut extending between said pair of support members, said first strut being coupled to said wheel assembly.

4. The cable guide apparatus as in claim 1, wherein said framework includes a second strut extending between said pair of support members, said second strut having a pair of spaced apart guide bars extending away therefrom and configured to receive a leg member in a nested arrangement of a carriage associated with the wheel assembly.

5. The cable guide apparatus as in claim 3, wherein each support member is generally perpendicular and adjustably positioned relative to said first strut.

6. The cable guide apparatus as in claim 1, wherein one of said plurality of roller members is positioned proximate a downstream edge of the rim and another one of said plurality of roller members is positioned proximate an upstream end of the rim, whereby to urge the conductor cable into the groove of an outer face of the rim when said guide assembly is coupled to the rim.

7. The cable guide apparatus as in claim 1, wherein:
said guide assembly includes a pair of roller assemblies pivotally coupled to said pair of support members, respectively, at least two of said plurality of said roller members being rotatably coupled to each roller assembly;
each roller assembly is movable between a first configuration in which respective roller members of a respective roller assembly is substantially parallel to said framework and a second configuration in which respective roller members are substantially perpendicular to said framework;
wherein at said second configuration one of said at least two of said plurality of said roller members is positioned outwardly adjacent one side of the groove of the rim of the wheel assembly and another of said at least two of said plurality of said roller members is positioned outwardly adjacent an opposite side of said groove of the rim of the wheel assembly so as to maintain the conductor cable in the groove.

8. A cable guide apparatus for use in guiding a conductor cable along a wheel assembly of a type having a rim rotatably coupled upon a hub and that defines a groove configured to receive the conductor cable, comprising:
a guide assembly that includes a framework having an upstanding support member that includes an upper end and an opposed lower end that has a generally linear configuration, said guide assembly having a roller assembly coupled to a respective support member;
a pair of roller members rotatably coupled to said roller assembly, each roller having a generally elongate and cylindrical configuration and rotatably coupled to said at least one support member and configured to selectively rotate when the conductor cable travels thereover;
wherein:
said roller assembly is movable between a first configuration in which pair of roller members is, together substantially parallel to said wheel assembly and a second configuration in which said pair of roller members is, together, substantially perpendicular to said wheel assembly;
wherein at said second configuration one of said at least pair of said roller members is positioned outwardly adjacent one side of the groove of the rim of the wheel assembly and another of said pair of said plurality of said roller members is positioned outwardly adjacent an opposite side of said groove of the rim of the wheel assembly so as to maintain the conductor cable in the groove.

9. The cable guide apparatus as in claim 8, wherein said framework includes:
another upstanding support member displaced from said support member;
a first strut extending between said support member and said another upstanding support member, said first strut being coupled to said wheel assembly.

10. The cable guide apparatus as in claim 9, wherein said framework includes a second strut extending between said support member and said another support member, said second strut having a pair of spaced apart guide bars extending away therefrom and configured to receive a respective leg member of said carriage in a nested arrangement.

11. The cable guide apparatus as in claim 8, wherein said at least one support member is adjustably positioned relative to said first strut.

12. The cable guide apparatus as in claim 8, wherein:
said wheel assembly includes a carriage having a first leg member positioned adjacent one side of said hub and a second leg member positioned adjacent another side of said hub, said carriage having a bridge interconnecting upper ends of said first and second leg members, respectively; and
said carriage operatively coupled to said hub of said wheel assembly.

13. The cable guide apparatus as in claim 12, further comprising a plurality of spokes extending between said hub and said rim, said plurality of spokes equally displacing said rim from said hub.

14. The cable guide apparatus as in claim 8, further comprising:
- an auxiliary wheel operatively coupled to said framework of said guide assembly, said auxiliary wheel having an auxiliary rim and defining an auxiliary groove configured to receive the conductor cable;
- wherein said auxiliary wheel is selectively positioned upwardly inline with said rim of said wheel assembly.

15. The cable guide apparatus as in claim 12, further comprising:
- an auxiliary wheel operatively coupled to said carriage of said wheel assembly, said auxiliary wheel having an auxiliary rim and defining an auxiliary groove configured to receive the conductor cable;
- wherein said auxiliary wheel is selectively positioned upwardly inline with said rim of said wheel assembly.

16. The cable guide apparatus as in claim 1, further comprising:
- an auxiliary wheel operatively coupled to said framework of said guide assembly, said auxiliary wheel having an auxiliary rim and defining an auxiliary groove configured to receive the conductor cable;
- wherein said auxiliary wheel is selectively positioned upwardly inline with the rim of the wheel assembly.

* * * * *